US008864880B2

(12) United States Patent
Kar et al.

(10) Patent No.: US 8,864,880 B2
(45) Date of Patent: Oct. 21, 2014

(54) MECHANICAL GAS POCKET PREVENTER/BREAKER

(75) Inventors: Kishore K. Kar, Midland, MI (US); Madan Somasi, Carmel, IN (US); Richard F. Cope, Midland, MI (US); James J. Pressler, Frankenmuth, MI (US); David J. Adrian, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/110,727

(22) PCT Filed: Apr. 10, 2012

(86) PCT No.: PCT/US2012/032862
§ 371 (c)(1),
(2), (4) Date: Oct. 9, 2013

(87) PCT Pub. No.: WO2012/142015
PCT Pub. Date: Oct. 18, 2012

(65) Prior Publication Data
US 2014/0060329 A1    Mar. 6, 2014

Related U.S. Application Data (60) Provisional application No. 61/474,006, filed on Apr. 11, 2011.

(51) Int. Cl.
*B01D 19/02* (2006.01)
*B01F 7/00* (2006.01)
*B01D 19/00* (2006.01)

(52) U.S. Cl.
CPC .............. *B01D 19/02* (2013.01); *B01F 7/0025* (2013.01); *B01D 19/0052* (2013.01); *B01D 19/0036* (2013.01); *B01F 7/00583* (2013.01)

USPC ................... 95/242; 95/260; 96/178; 96/204; 366/325.7; 422/139; 198/533; 222/216; 141/331; 416/227 R (58) Field of Classification Search
CPC ............................ B01D 19/0052; B01D 19/02
USPC ............ 95/242, 260; 96/178, 204; 366/325.7, 366/325.8, 325.9, 325.91; 416/227 R, 227 A; 198/533
See application file for complete search history.

(56) References Cited

U.S. PATENT DOCUMENTS 2,610,155 A * 9/1952 Humfeld et al. ................. 96/177
4,140,402 A 2/1979 McAllister et al.
(Continued)

FOREIGN PATENT DOCUMENTS

FR    1201588 A    7/1958
GB    15210       0/1902
(Continued)

OTHER PUBLICATIONS

Deshpande, et al. Performance Characteristics of Novel Mechanical Foam Breakers in a Stirred Tank Reactor, Journal of Chemical Technology and Biotechnology, vol. 74, Issue 10, pp. 979-987, 1999.
(Continued)

*Primary Examiner* — Duane Smith
*Assistant Examiner* — Douglas Theisen
(74) *Attorney, Agent, or Firm* — Christopher A. Johnson (57) ABSTRACT

Described is an apparatus useful for mechanically delaying formation of or breaking a pocket and a method of delaying formation of or breaking a gas pocket employing the apparatus.

9 Claims, 2 Drawing Sheets

(56) References Cited

U.S. PATENT DOCUMENTS 5,792,246 A * 8/1998 Nishiguchi ............... 96/177
5,865,539 A    2/1999 Rogers

FOREIGN PATENT DOCUMENTS

GB     1233411        5/1971
JP     2003290605 A   10/2003

OTHER PUBLICATIONS

Takesono, et al. Performance Characteristics of Mechanical Foambreakers fitted to a Stirred-tank Reactor, Journal of Chemical Technology and Biotechnology, vol. 78, Issue 1, pp. 48-55, 2002.
International Search Report and Written Opinion for PCT/US2012/032862 dated Jun. 13, 2012 citing FR1201588.

* cited by examiner

MECHANICAL GAS POCKET PREVENTER/BREAKER

The invention generally relates to an apparatus useful for mechanically delaying formation of or breaking a gas pocket and a method of delaying formation of or breaking a gas pocket employing the apparatus.

Deshpande N. S. and Barigou M., and Takesono S. et al., separately mention various constructs of mechanical bubble breakers in the *Journal of Chemical Technology and Biotechnology* (1999; 74:979-987 and 2002; 78:48-55, respectively). Examples are a pitched blade turbine, disc turbine, two-blade paddle, two-blade paddle with 3 slits, two-blade paddle with 168 needles, six-blade turbine, six-blade vaned disc, conical rotor, fluid-impact dispersion apparatus, and rotating disk mechanical foam-breaker.

A problem addressed by the present invention includes providing an alternative construct of a mechanical bubble/breaker.

BRIEF SUMMARY OF THE PRESENT INVENTION

In a first aspect the present invention provides a mechanical gas pocket preventer/breaker ("Preventer/Breaker") comprising a cylindrical hub having a rotational axis and first and second braced asterisk-shaped assemblies, each assembly comprising at least 3 arm members and at least 3 brace members in operative connection therebetween, wherein the arm members of each assembly are in radial operative connection to and circumferentially spaced around the hub in such a way such that the first assembly is generally parallel to and spaced-apart from the second assembly.

In a second embodiment the present invention provides a method of delaying formation of or breaking a gas pocket, the method comprising rotating the mechanical gas pocket preventer/breaker in operative contact with the gas pocket until formation of the gas pocket is delayed or the gas pocket is broken.

In a third embodiment the present invention provides a manufactured article comprising the mechanical gas pocket preventer/breaker.

The Preventer/Breaker and method are useful and effective for delaying formation of gas pockets, breaking formed gas pockets, or both. Examples of types of such gas pockets are a gas/liquid bubble, gas/liquid foam, and rathole, which is a gas pocket in a bed of solid particulates or "particulate solids." Such gas pockets can form, for example, during or after a gas pocket-generating operation. Examples of such an operation are a fermentation or other gas generating reaction in a liquid and operation of a fluidized moving bed.

The present invention provides a number of advantages. For example, the Preventer/Breaker delays formation of, reduces number, size, lifetime, or a combination thereof of gas pockets (e.g., bubble(s) or foam). Also, the Preventer/Breaker delays formation, reduces size, or reduces lifetime, or a combination thereof of ratholes in flowing particulate solids. It is surprising that one device can effectively perform both bubble breaking and rathole formation prevention or rathole breaking.

Additional embodiments are described in accompanying drawing(s) and the remainder of the specification, including the claims.

BRIEF DESCRIPTION OF THE DRAWING(S)

Some embodiments of the present invention are described herein in relation to the accompanying drawings.

DETAILED DESCRIPTION OF THE PRESENT INVENTION

The embodiments of the present invention summarized previously and the Abstract are incorporated here by reference. Gas pockets can form in a gas pocket supporting material (described later). A rathole is a gas pocket in particulate solids. The rathole can form when particulate solids flow through a conduit or aperture having a flow channel with a diameter smaller than maximum size of a stable rathole. A portion of the particulate solids cake and build upon themselves, forming an arch or bridge across the channel, and then a portion of the bridge (typically including dust or fines) falls way from the bridge and forms the rathole. The caking can be facilitated by a caking effective amount of a liquid disposed in the caking portion of the particulate solids. The liquid can be present for any of a number of reasons including as an ingredient of a composition comprising the liquid and the particulate solids, as a residual liquid from a process for preparing or isolating the particulate solids, or as an adsorbed liquid from a vaporous atmosphere in contact with the particulate solids (e.g., water vapor adsorbed from humid air). Ratholes are a common problem plaguing fluidized moving beds. Examples of the fluidized moving bed are fluidized moving bed reactors and fluidized moving bed conveyors or hoppers. For purposes of this invention, the gas/liquid bubble is considered broken when it collapses, the gas/liquid foam is considered broken when it materially decreases in size (total volume), e.g., when it is reduced in total volume by at least 20 volume percent (vol %), and the rathole is considered broken when its bridge collapses. The Preventer/Breaker and method are useful and effective for delaying formation of gas pockets, breaking formed gas pockets, or both. In some embodiments of the method formation of the gas pocket is delayed (e.g., time period to onset is increased by at least 25% (e.g., from 1 hour to 1.25 hours), more preferably by at least 50%, and still more preferably by more than 100%). In other embodiments of the method the gas pocket is broken. In some embodiments the gas pocket comprises a gas/liquid bubble, and in other embodiments a gas pocket in particulate solids (e.g., rathole).

The first assembly is spaced-apart from the second assembly when the first and second assemblies are viewed from a direction perpendicular to the axis of the hub of the Preventer/Breaker. In some embodiments the Preventer/Breaker further comprises a third braced asterisk-shaped assembly. More preferably, the Preventer/Breaker contains at most 3, and in other embodiments only 2, such assemblies. The first and second assemblies are adjacent each other and the second and third assemblies are adjacent each other. Thus, the first, second and third assemblies are disposed in sequence axially along the hub.

The Preventer/Breaker can be constructed as, and in some embodiments comprises, a single monolithic form (i.e., the arm and brace members and hub comprise portions of a unitary piece as obtained from a rapid prototyping or 3-dimensional printing method). Alternatively, the Preventer/Breaker can be constructed as, and in some embodiments comprises, a plurality of operatively connected components form (e.g., a plurality of separately manufactured arm and brace members and hub that have been operatively connected together by a plurality of connecting means). Alternatively, the Preventer/Breaker can be constructed as, and in some embodiments comprises, a combination construction form comprising a monolithic portion comprising a portion of the single monolithic form and at least one other portion comprising some of the plurality of operatively connected components, wherein the monolithic portion is in operative connection to the at least one other portion. For convenience the Preventer/Breaker is mostly described herein as if it is entirely constructed from the plurality of operatively connected components. Except for the connecting means or some of the connecting means, such description applies also to the single monolithic form and the combination construction form, respectively.

The arm members of the assemblies all radiate from the hub of the Preventer/Breaker. The number of arm members in different assemblies can be different or, preferably, the same. Preferably, at least one, and more preferably each assembly comprises at least 6 arm members. Preferably, each assembly comprises at most 12 arm members, which more preferably are evenly circumferentially spaced-apart from each other around the hub. Preferably, the number of arm members of the first assembly is equal to the number of arm members of the second assembly and, if present, the number of arm members of the third assembly. The radial operative connection of the arm members relative to the rotational axis of the hub can be angular (similar to a spoke-type bicycle wheel) or, preferably perpendicular (similar to a spoke-type cart wheel). Each arm member has a length, thickness, spaced-apart inner and outer ends, and a midpoint therebetween, wherein the inner end is where the arm member is in the radial operative connection to the hub. Preferably, all of the arm members of the first assembly have the same length. Preferably, all of the arm members of the second assembly have the same length. More preferably, all arm members of all assemblies have the same length.

For convenience in describing operative connections of brace members to different arm members, each arm member can be said to have inner, mid, and outer portions, each portion being one third of the arm member. The outer portion includes the outer end of the arm member, the mid portion includes the midpoint of the arm member, and the inner portion includes the inner end of the arm member.

Each brace member has a length, thickness, and spaced-apart inner and outer ends, which ends are in operative connection to two different, preferably adjacent, arm members in a same assembly. The number of brace members in different assemblies can be the same or, preferably, different. In some embodiments the first assembly has more brace members than the second assembly. For maintaining structural integrity and strength, as length of the arm members of a particular material in each of the assemblies increases, generally the preferred number of brace members in each of the assemblies increases too, provided that the arm members are longer than the longest brace members. Preferably, at least one, and more preferably each assembly comprises at least 6 brace members. In embodiments where each assembly comprises at most 12 spaced-apart arm members, preferably each assembly also comprises at most 36 brace members in operative connection therebetween, wherein more preferably the brace members between a same two arm members are evenly spaced-apart from each other. In some embodiments there are twice as many brace members as arm members in at least one of the assemblies such that there are from 6 to 12 arm members and from 12 to 24 brace members, respectively, in the at least one assembly, and the brace members consist of from 6 to 12 mid brace members and from 6 to 12 outer brace members. In some embodiments there are thrice as many brace members as arm members in at least one of the assemblies such that there are from 6 to 12 arm members and from 18 to 36 brace members, respectively, in the at least one assembly, and the brace members consist of from 6 to 12 inner brace members, from 6 to 12 mid brace members, and from 6 to 12 outer brace members. As used for brace members, the terms "inner," "mid," and "outer" mean positions relative to the hub, wherein inner is closest to the hub and outer is furthest from the hub and mid is between inner and outer. The ends of each outer brace member is in operative connection to the outer portions of two adjacent arm members of a same assembly, the ends of each mid brace member is in operative connection to the mid portions of the two adjacent arm members, and the ends of each inner brace member is in operative connection to the inner portions of the two adjacent arm members. The arm members are longer than the outer brace members, which are longer than the mid brace members, and which are longer than the inner brace members, if any. Preferably, each assembly independently has a plurality of outer brace members in operative connection to the outer portions, more preferably outer ends, of the arm members. Each brace member can be straight or curved. When there are only 3, 4 or 5 arm members in a particular assembly, preferably outer brace members are curved, and more preferably curved so as to align with a hypothetical circle including outer ends of the arm members (to use the aforementioned spoke-type cart wheel analogy again, the hypothetical circle would trace over the rim of the spoke-type cart wheel). When there are 6 or more arm members in a particular assembly, the outer brace members can be straight or curved, and more preferably curved so as to align with the hypothetical circle. For optimal gas pocket breaking effectiveness, preferably the outer brace members are curved. For ease or manufacturing of the outer brace members, or cost of construction of the Preventer/Breaker, in other embodiments the outer brace members, especially when there are 6 or more arm members in their assembly (e.g., the first or second assembly), are straight.

For optimal gas pocket breaking effectiveness, preferably a majority (more preferably all) of the arm members of the first assembly are rotationally offset from a majority (more preferably all) of corresponding ones of the arm members of the second assembly when the first and second assemblies are viewed down the axis of the hub of the mechanical gas pocket preventer/breaker. The rotational offset with respect to the arm members of different assemblies is used in a mathematical sense. Preferably, the rotational offset is less than 2 times, more preferably less than 1.5 times, and still more preferably is 1 time, the thickness of the arm members.

It can be beneficial for increasing mechanical integrity, strength, durability, or a combination thereof to interconnect or link adjacent assemblies together. Preferably, the interconnection is achieved with at least 3 linking members, and more preferably with a number of linking members equal to the number of arm members in the assembly having fewest arm members. Each linking member has a length and spaced-apart inner and outer ends, which ends are in operative connection to two different, preferably adjacent, arm members in adjacent (different) assemblies. More preferably, the linking members are in operative connection to the outer portions, still more preferably to the outer ends, of the arm members of the adjacent assemblies. In some embodiments the Preventer/Breaker further comprises from 6 to 12 linking members in operative connection to and between nearest outer portions of arm members of the first and second assemblies. Preferably, the linking members are shorter than the outer brace members, and more preferably are also shorter than the mid brace members.

The arm and brace members independently can be solid or hollow, continuous or discontinuous (e.g., having apertures), straight or contoured, and can have any cross-sectional profile including polygonal, oval, hemispherical, and preferably round (e.g., solid or circular). Preferably, the arm and brace members are straight. The linking members linking adjacent assemblies independently can be mechanically stiff (e.g., a metal bar) or flexible (e.g., a cable or chain), solid or hollow, continuous or discontinuous (e.g., having apertures), straight or contoured, and can have any cross-sectional profile including polygonal, oval, semicircular, and preferably round (e.g., solid or circular). Preferably, the linking members are straight and mechanically stiff and circular in cross-section.

The hub comprises a cylindrical wall having spaced apart inner and outer surfaces defining a thickness. The hub has an inner diameter perpendicular to its inner surface. Preferably, the inner diameter along the hub's axis is a constant length, i.e., preferably the hub is not conical, curved, or undulating, but is an axially straight-walled cylinder. In some embodiments the hub further comprises a flange and the hub is a flanged hub. Preferably, the hub is not flanged. In some embodiments the wall of the hub is monolithic. In such embodiments the arm members can be connected to the monolithic walled hub by a suitable connecting means such as, for example, soldering or welding. Preferably, the wall of the hub defines a plurality of arm-receiving apertures, which can be contoured in any suitable manner such as smooth bore, conical or axially straight walled cylindrical, including internally screw threaded. In such embodiments the arm members can be connected to the hub proximal to the arm-receiving apertures by a suitable connecting means such as, for example, an adhesive, friction fit, externally screw-threaded fastener (e.g., screw or bolt), rivet, soldering, or welding.

In some embodiments the hub further defines at least one fastener-receiving aperture, which can be contoured in any suitable manner such as smooth bore, conical or cylindrical, including internally screw threaded. The fastener-receiving aperture can be used to connect the Preventer/Breaker to a rotatable stir shaft. When the rotatable stir shaft has a diameter that is shorter than the inner diameter of the hub, the Preventer/Breaker can further comprise a cylindrical adaptor for effectively shortening the inner diameter of the hub, wherein the hub is in sequential operative connection to the cylindrical adaptor and rotatable stir shaft.

Preferably, thicknesses of the arm and brace members and hub of the Preventer/Breaker are sufficiently small such that, even with the rotationally offset orientation of the arm members of the preferred embodiment having such orientation, the assemblies and hub do not obstruct more than 50 area %, more preferably not more than 33 area %, and still more preferably not more than 25 area % of a material flowing sequentially through the assemblies (axially past the hub). Another way of putting this is that if Preventer/Breaker is placed inside a cylindrical conduit having a wall defining a cross-sectional area and contacting outer ends of the longest arm members of the Preventer/Breaker, and having an axis that is the same as the axis of the hub of the Preventer/Breaker, then the Preventer/Breaker would comprise less than 50 area %, more preferably less than 33%, and still more preferably less than 25% of the cross-sectional area defined by the cylindrical conduit. More preferably, this preferred low obstruction feature of the Preventer/Breaker would also hold for the embodiment of the Preventer/Breaker having three assemblies.

The Preventer/Breaker is effective for preventing formation of or breaking gas pockets at any rate of rotation greater than 0 revolutions per minute (rpm). Generally, the effectiveness is expected to be directly proportional to the gas pocket preventing/breaking-effective rotation rate. Preferably, the rotation rate is from 1 rpm to 1,000 rpm. An optimal rotation rate for a particular application can be readily determined by an artisan of ordinary skill by starting at a low rotation rate (e.g., 1 rpm), and gradually increasing the rotation rate until an optimal effect under the conditions is obtained. Factors influencing rotation rate include chemical composition, density, and particle size (if any) of the gas pocket supporting material; flow rate, if any, of the gas pocket supporting material; In some applications (e.g., where gas pocket material is dense particulate solids or a fermentation broth) a rotation rate of from 1 rpm to 50 rpm is preferred, while in other applications (e.g., where gas pocket material is an organic or inorganic particulate dispersion or detergent) a rotation rate of from 50 rpm to 500 rpm is preferred, while in still other applications a rotation rate >500 rpm is preferred. The Preventer/Breaker can be rotated by any suitable means including manually, mechanically, or, preferably, a stir motor (e.g., air driven, electric, or fuel-powered stir motor) such as a LIGHTNIN brand top entry mixer from SPX Corporation (Charlotte, N.C., USA).

The Preventer/Breaker can be constructed and is useful in any suitable size ranging from a small size suitable for use in high throughput workflow applications (e.g., from 1 centimeter (cm) to <20 cm), mid size (e.g., arm members having a length of from 0.2 meter (m) to 2 m), to a large size (e.g., arm members having a length of from >2 m to 20 m or longer) suitable for use in an industrial scale stirred tank reactor or fluidized bed.

The Preventer/Breaker can be constructed from any suitable material having sufficient mechanical strength and stiffness, and, if desired, chemical and thermal compatibility, for the intended gas pocket preventing or breaking operation. Choice of such a suitable material for a particular application can be readily made by an artisan of ordinary skill. Materials for constructing the Preventer/Breakers intended for use in low viscosity gas/liquid bubble or foam generating operations can be of lower mechanical strength/stiffness than mechanical strength/stiffness of materials for constructing Preventer/Breakers intended for fluidized bed operations. Construction materials that have been used in the art for agitator components (e.g., impellers and stir shafts) and fluidized bed components (e.g., reactor or hopper walls) are preferred. Examples of suitable construction materials are metals (e.g., titanium), metal alloys (e.g., steel, stainless steel, and HASTELLOY® (Haynes International, Inc.) alloys), glass (e.g., a borosilicate glass), ceramic, an organic polymer (e.g., poly (acrylic acid), polypropylene and polytetrafluoroethylene (PTFE)), reinforced plastic (e.g., fiberglass reinforced plastic), and combinations thereof. More preferred construction materials are the metals and metal alloys such as, for example, number 316 stainless steel. A plurality of Preventer/Breakers having a suitable scale size can be used in high throughput workflow systems, which prefer construction materials such as the organic polymer.

The monolithic form or portion of the ad rem embodiment of the Preventer/Breaker can be manufactured by employing rapid prototyping (e.g., fused deposition modeling) or 3-dimensional printing using an organic polymer and machine suitable for use in rapid prototyping. An example of a suitable rapid prototyping machine is the FDM TITAN, model no. T0043, from Stratasys Inc., Eden Prairie, Minn., USA. Examples of organic polymers suitable for use in rapid prototyping are polycarbonate, poly(acrylonitrile-butadiene-styrene) (ABS), and poly(phenylsulfone). Alternatively, the monolithic form or portion can be manufactured by technique such as, for example, casting or injection molding such as metal casting or injection molding a thermoplastic organic polymer. The Preventer/Breaker embodiment comprising the plurality of operatively connected components, and the other portion of the combination form, can be manufactured by operatively connecting the plurality of components (e.g., a plurality of separately manufactured arm and brace members and hub) with the plurality of connecting means. Examples of suitable connecting means are weld, solder, rivet, adhesive, externally screw-threaded fastener (e.g., screw or bolt)/internally screw-threaded aperture, clamp, wire-through-apertures, and friction fit.

The Preventer/Breaker can be integrated into any suitable manufactured article. In some embodiments the manufactured article is one that is not in need of a mechanical gas pocket formation preventing or breaking functionality. Examples of such manufactured articles are those wherein the Preventer/Breaker is used to provide a basic mixing or agitating function (irrespective of gas pocket functionality) or a structural support function (e.g., as in a cylindrical conduit such as an oil pipeline).

More preferably, the manufactured article is one that is in need of a mechanical gas pocket formation preventing or breaking functionality. Examples of such manufactured articles are stirred tank reactors, especially stirred tank fermentors; bioreactor; non-stirred tank fermentor; stirred tank strippers; rotary evaporators; fluidized bed reactors; conveyors, funnels, and hoppers suitable for use with particulate solids; and carbonated beverage containers (e.g., during a filling operation). For example, in embodiments where the manufactured article comprises a stirred tank fermentor comprising a container for holding a liquid broth for fermentation (e.g., aerobic fermentation) and the Preventer/Breaker, which is disposed in the headspace of container above the broth or, in other embodiments, is disposed in the broth, where, for example, it is effective for preventing or decreasing degree of gas/liquid bubble formation. In some embodiments the stirred tank fermentor has an agitator comprising a stir motor and a stir shaft having upper and lower portions and an impeller for agitating the broth in the container, wherein the impeller is in operative connection to the lower portion of the stir shaft, and the Preventer/Breaker is disposed via the hub in direct or indirect operative connection to a higher portion (e.g., mid or upper portion) of the stir shaft, and a drive portion of the motor is disposed in rotatable operative connection to the upper portion of the stir shaft. In such embodiments the Preventer/Breaker is preferably disposed in the headspace of the container. During operation of the stirred tank fermentor, fermentation generates gas/liquid bubble(s) from the broth, which bubble(s) rise(s) in the stirred tank fermentor until they come into operative contact with the Preventer/Breaker in the headspace, and the stir motor drives rotation of the Preventer/Breaker, which breaks the gas/liquid bubble(s), releasing the gas and allowing the liquid to return to the broth. Alternatively in a fluidized bed embodiment, the Preventer/Breaker can be disposed in rotatable operative connection to the lower portion of the stir shaft and in contact to the solid particulates of the fluidized bed in such a way that the motor can drive rotation of the Preventer/Breaker in the solid particulates to delay formation of a rathole therein or break the rathole once it is formed or both.

Examples of the gas pocket supporting material are liquids that can form gas/liquid bubbles and particulate solids that can form ratholes. Examples of liquids that can form gas/liquid bubbles or foams that can be broken by the Preventer/Breaker and method are fermentation broths, beer, champagne, wine, reaction mixtures, emulsions, soaps, and detergents. The gases include air, natural gas, flue gas, and a gas of a carbon oxide (e.g., carbon dioxide), sulfur oxide (sulfur trioxide), methane, ethane, ethylene, oxygen, nitrogen, argon, or helium. Examples of particulate solids that can form ratholes that can be broken by the Preventer/Breaker and method are poly(ethylene terephthalate) (PET) flakes, polypropylene pellets, clays (inorganic and organic), lumps of coal, finely divided amorphous and crystalline minerals (e.g., rock salt), fumed silica, mothballs, pharmaceutical tablets and capsules, and Portland cement.

Some embodiments of the invention are described in more detail in the following Examples.

Example 1A

Figure 1:
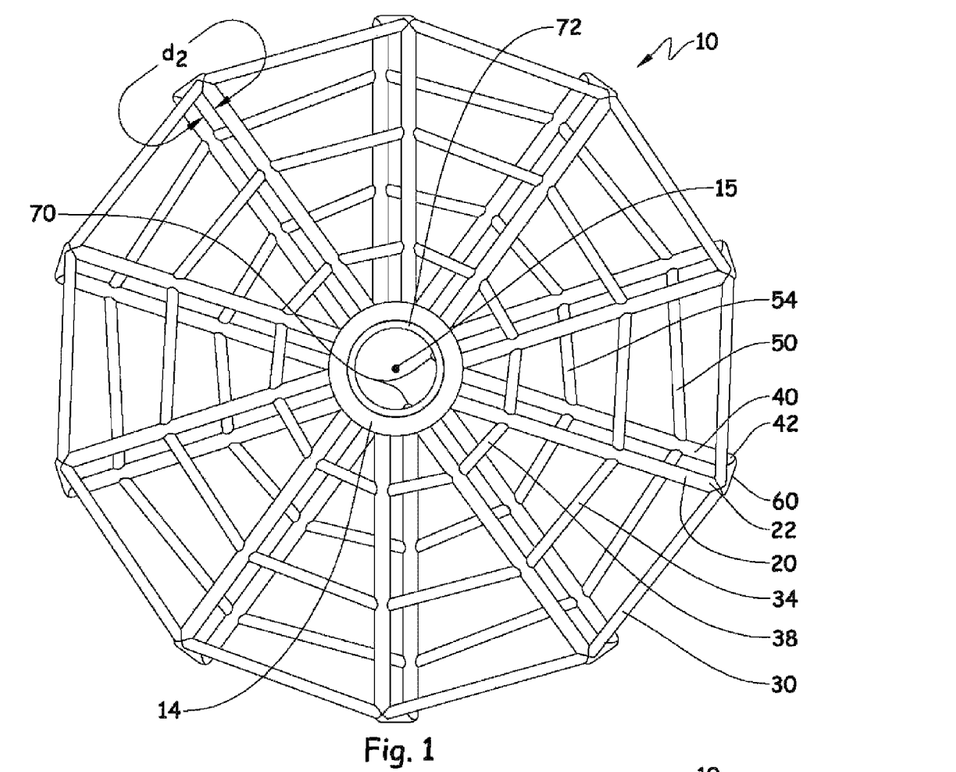
FIG. 1: top down view of a preferred embodiment of the Preventer/Breaker.
Figure 2:
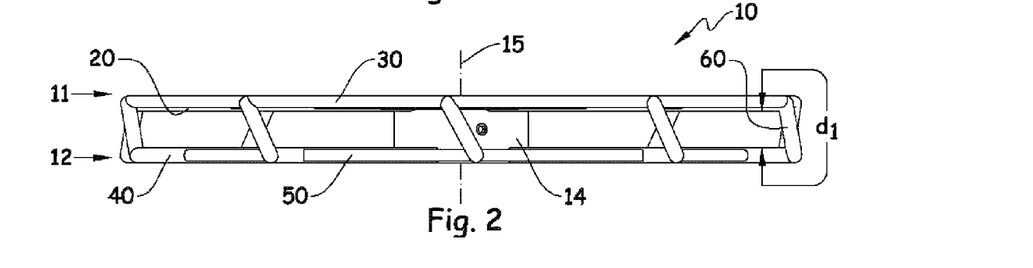
FIG. 2: side view of the Preventer/Breaker of FIG. 1.
Figure 3:
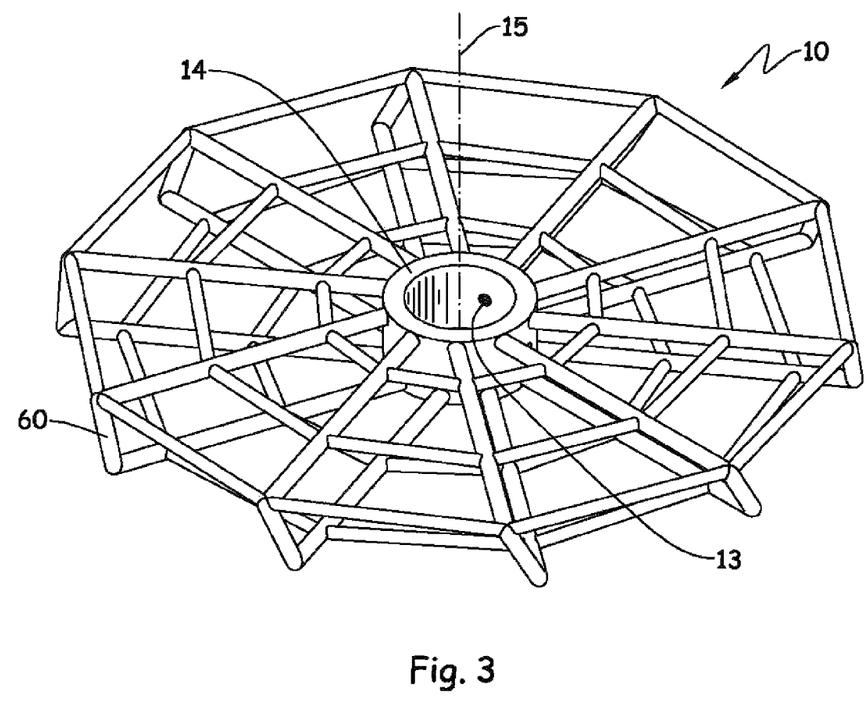
FIG. 3: partially-exploded one-quarter view of the Preventer/Breaker of FIG. 1.

A preferred embodiment of the Preventer/Breaker is apparatus 10 shown in FIG. 1. In FIG. 1, Apparatus 10 has a diameter of 12 inches (30 cm) and comprises first (top) and second (bottom) braced asterisk-shaped assemblies 11 and 12 (FIG. 2); cylindrical hub 14; and optionally ten linking members 60; two externally screw threaded fasteners 70 and cylindrical adaptor 72. Hub 14 is axially straight walled and defines a plurality of arm-receiving apertures (not visible), two fastener-receiving apertures 13 (FIG. 3), and has axis 15 and inner diameter (not indicated). The first (top) braced asterisk-shaped assembly 11 (FIG. 2) comprises ten arm members 20, ten outer brace members 30, ten mid brace members 34, and ten inner brace members 38. The second (bottom) braced asterisk-shaped assembly 12 (FIG. 2) comprises ten arm members 40, ten outer brace members 50, and ten mid brace members 54. The second (bottom) braced asterisk-shaped assembly 12 (FIG. 2) lacks inner brace members. Arm members 20 have inner ends (not visible) and outer ends 22, and inner ends (not visible) of arm members 20 are in radial operative connection to hub 14 via connecting means (e.g., welds or friction fit) such that arm members 20 are circumferentially spaced around hub 14. Arm members 40 have inner ends (not visible) and outer ends 42, and inner ends (not visible) of arm members 40 are in radial operative connection to, and disposed in the arm-receiving apertures (not visible) of hub 14 such that arm members 40 are circumferentially spaced around hub 14. First assembly 11 (FIG. 2) is generally parallel to and spaced-apart from by separation distance $d_1$ (FIG. 2) second assembly 12 (FIG. 2) when the first and second assemblies 11 and 12 (FIG. 2) are viewed (as shown in FIG. 2) from a direction perpendicular to axis 15 of hub 14. Also, all of arm members 20 of first assembly 11 (FIG. 2) are rotationally offset from all corresponding ones of arm members 40 of second assembly 12 (FIG. 2), as indicated by rotational offset distance $d_2$. Linking members 60 are in operative connection to outer ends 22 and 42 of different and adjacent arm members 20 and 40 of first and second assemblies 11 and 12 (FIG. 2), respectively. Cylindrical adaptor 72 defines two connecting apertures (not visible) and is used if desired for effectively shortening the inner diameter (not indicated) of hub 14 such that cylindrical adaptor 72 is disposed inside of and in operative connection at connecting apertures (not visible) with, hub 14 via two externally screw threaded fasteners 70. In this way hub 14 can be placed in sequential operative connection via cylindrical adaptor 72 to a rotatable stir shaft (not shown) having a diameter that is less than inner diameter (not indicated) of hub 14. FIG. 2 shows an edge view of apparatus 10. FIG. 3 shows a partially exploded, three-quarter view of apparatus 10 that includes linking members 60, externally screw threaded fasteners 70, cylindrical adaptor 72, and fastener-receiving apertures 13 of hub 14.

Example 1 shows how a preferred embodiment of the Preventer/Breaker is constructed, including optional components (e.g., 60, 70, 72).

Example 1B

A preferred embodiment of the Preventer/Breaker that is similar to apparatus 10 shown in FIG. 1 except the Preventer/Breaker of Example 2 is prepared as a single monolithic article by rapid prototyping polycarbonate using the FDM TITAN, model no. T0043 rapid prototyping machine. Thus, the Preventer/Breaker of Example 2 lacks the arm-receiving apertures and connecting means of Example 1.

Example 2

Breaking gas/liquid bubble with apparatus 10. Add 35 gallons (133 liters) of Lubrizol Corp. (Cleveland Ohio, USA) CARBOPOL-water solution having a viscosity of 300 centipoise to a 50.5 inch (128 cm) height/17.5 inch (44.5 cm) nominal diameter polycarbonate, baffled (4) cylindrical tank equipped with a stainless steel bottom, a 5.25 inch (13.3 cm), ring sparger, a rotatable agitator, and a load cell. The rotatable agitator comprises a stir shaft sequentially operatively connected bottom to top with impellers (bottom 7 inch (18 cm) gas dispersing radial flow turbine (LIGHTNIN CD-6) at bottom, and sequentially above three 7 inch (18 cm) axial flow hydrofoil type impellers (LIGHTNIN A315) spaced 7.125 inches (18 cm) apart); and, above all on the stir shaft, apparatus of Example 1B. The load cell is a 1-pound (2.2-kilogram (kg)) load cell LSB200-L2357, JR S-beam load cell LSB 10002 (FUTEK Advanced Technology, Inc. Columbus, Ohio, USA) fitted with a 3 inch-by-3 inch (7.6 cm-by-7.6 cm) square, 1/32 inch (0.079 cm) thickness steel plate having a sensitivity of ±0.05%. The rotatable agitator is disposed in the cylindrical tank such that the apparatus of Example 1B is disposed 8.5 inches (22 cm) above surface of the solution and the load cell is spaced 9.75 inches (25 cm) above the surface of the solution. In a series of experiments, with the rotatable agitator, and thus the apparatus of Example 1B, rotating at speeds of from 250 rpm to 400 rpm in 50 rpm increments while also varying air flow rate metered through sparger from 4 standard cubic feet per minute (scfm) to 7 scfm in 1 scfm increments, and record volumetric flow of gas per minute per volume of liquid in the tank (VVM (minute$^{-1}$)) number of bubble strikes on the load cell. The fewer the bubble strikes on the load cell, the more effective is the bubble breaking effect of apparatus 10. In comparative experiments, repeat the above procedure using the same set up except using a rotatable agitator lacking a Preventer/Breaker. Data are shown in Table 1:

| Agitation speed (rpm) | Gas flow rate (scfm) | Gas VVM (min$^{-1}$) | Number of strikes without Apparatus 10 (Comparative) | Number of strikes with Apparatus 10 |
|---|---|---|---|---|
| 250 | 4 | 1.09 | 0 | 0 |
| 250 | 5 | 1.53 | 0 | 0 |
| 250 | 6 | 2.08 | 0 | 0 |
| 250 | 7 | 2.82 | 16 | 0 |
| 300 | 4 | 1.09 | 2 | 0 |
| 300 | 5 | 1.54 | 2 | 0 |
| 300 | 6 | 2.10 | 18 | 0 |
| 300 | 7 | 2.77 | 19 | 0 |
| 350 | 4 | 1.09 | 4 | 0 |
| 350 | 5 | 1.54 | 4 | 0 |
| 350 | 6 | 2.07 | 7 | 0 |
| 350 | 7 | 2.82 | 15 | 1 |
| 400 | 4 | 1.09 | 7 | 0 |
| 400 | 5 | 1.54 | 6 | 0 |
| 400 | 6 | 2.10 | 4 | 0 |
| 400 | 7 | 2.77 | 9 | 1 |

Example 2 shows that the Preventer/Breaker is surprisingly effective at breaking gas/liquid bubbles.

Example 3

Breaking ratholes with the apparatus of Example 1B. General procedure: Add thermoplastic hollow microsphere powder (true density, d=0.04 gram/milliliter) to a cylindrical fluidized bed (drum) having a cylindrical wall, bottom and top defining an enclosed volumetric space (interior), the bed having a 20 inch nominal diameter and 25.5 inch height. A porous filter plate is horizontally disposed in the bed 8 inches above bed bottom, the apparatus of Example 1B is disposed in bed 1.75 inches above the filter plate, a powder inlet/outlet disposed in bed 3.5 inches above filler plate, a gas side inlet disposed in bed below filler plate and a gas outlet disposed in bed top. The apparatus of Example 1B is in operative connection to a stir shaft, which together comprise a rotatable agitator. Dispose the microspheres on the filter plate in the bed on the filter plate and all around the apparatus of Example 1B, the microspheres being disposed to a fill height of either 3 inches (7.6 cm) or 7 inches (18 cm), as the case may be, above the centerline of the powder inlet/outlet. The microspheres in the bed are disposed to be in sequential fluid communication with the powder inlet/outlet, a length (2.33 feet (0.71 m)) of elastomeric tubing (MASTERFLEX 6424-82), an inlet of a powder handling pump, an outlet of the powder handling pump, another length (2 feet (0.61 m)) of elastomeric tubing, and a 3.8 liter capacity jar placed on an electronic balance for recording weight of the collected microspheres ("catch weight"). Total length between the powder inlet/outlet of the bed and the jar is 5 feet (1.5 m). For setting up a run (experiment), if necessary, add the microspheres to the bed, or as the case may be remove microspheres from the bed, to achieve a desired fill height. Maintain interior of fluidized bed (drum) under an inert atmosphere with a constant purge of nitrogen gas flowing at a flow rate of 860 standard cubic centimeters (sccm)±5 sccm therethrough. Then, perform the run by activating the pump to a desired rotation rate (e.g., 200 rpm or 260 rpm) and removing the microspheres from the bed and collecting the removed microspheres in the jar, all with or without rotation of the rotatable agitator, and thus with rotation (invention, e.g., 20 rpm or 40 rpm) or without rotation (comparative, non-invention, 0 rpm) of the apparatus of Example 1B, as the case may be. Use a timer to record the length of time (catch weight time) of each run (typically from 13 to 45 seconds). Record catch weight of solids (microspheres) collected in the jar after the catch weight time, and calculate solids (microspheres) flow rate in grams per minute (g/min) based on the catch weight.

Using the above procedure, conduct 16 runs. Run numbers (nos.) 1-16: Perform 5 runs (run nos. 1-5; nominal fill height 7 inches) sequentially each with the powder handling pump rotating at speed of 260 rpm as follows: perform run 1 with microspheres filled to the 7 inches fill height and the apparatus of Example 1B rotating; then stop rotating the apparatus of Example 1B; perform run 2 with the apparatus of Example 1B not rotating; then perform run 3 with the apparatus of Example 1B not rotating; then perform run 4 with the apparatus of Example 1B not rotating; then perform run 5 with the apparatus of Example 1B rotating (to show recovering of solids flow rate). Perform another 5 runs (run nos. 6-10, nominal fill height 3 inches) sequentially with the powder handling pump rotating at speed of 260 rpm as follows: remove microspheres from bed after run 5 so the microspheres are at the 3 inches fill height and perform run 6 with the apparatus of Example 1B rotating; then stop rotating the apparatus of Example 1B and then perform run 7 with the apparatus of Example 1B not rotating; then perform run 8 with the apparatus of Example 1B not rotating; then perform run 9 with the apparatus of Example 1B not rotating; then perform run 10 with the apparatus of Example 1B rotating (to show recovering of solids flow rate). Perform another 6 runs (run nos. 11-16, nominal fill height 3 inches) sequentially with the powder handling pump rotating at speed of 200 rpm as follows: add microspheres collected in jar from runs 6-10 back into bed and then perform run 11 with the apparatus of Example 1B rotating; then stop rotating the apparatus of Example 1B and perform run 12 with the apparatus of Example 1B not rotating; then perform run 13 with the apparatus of Example 1B not rotating; then perform run 14 with the apparatus of Example 1B not rotating; then perform run 15 with the apparatus of Example 1B rotating (to show recovering of solids flow rate); and then perform run 16 with the apparatus of Example 1B rotating at a slower rotation rate than rotation rate of run 15. (Observe that microspheres fill level in bed does not fall significantly from run no. 1 to run no. 5; or from run no. 6 to run no. 10; or from run no. 11 to run no. 16, as only a small amount of microspheres are removed during runs compared to initial amount of microspheres present in bed.) Data and run details are shown in Table 2:

The Preventer/Breaker is surprisingly effective at delaying formation of or breaking ratholes and avoiding a dramatic decrease of solids flow rate that is observed when the apparatus of Example 1B is not rotating. In the particular experiments reported in Table 2, a solids flow rate of greater than 60 g/min indicates the absence or breaking of ratholes, whereas a solids flow rate of less than 60 g/min indicates presence of ratholes, which decrease solids flow rate. The data in Table 2 show that at a higher fill level of solids (microspheres) in the fluidized bed (drum) (see run nos. 1-5), the solids flow rate is relatively insensitive to the agitator motion, indicating that a rathole does not form at 7 inches fill level. However, as the fill level of the solids (microspheres) is decreased to less than half (3 inches) (see run nos. 6-16), ratholes form when the apparatus of Example 1B is not rotated but do not form when the apparatus of Example 1B is rotated. Further, size of ratholes increase over time as indicated by decreasing solids flow rates when the apparatus of Example 1B is not rotated (compare run nos. 7-9 and run nos. 12-14). Thus rotation of the apparatus of Example 1B enables maintenance of a steady flow rate of solids from the fluidized bed. Under the lower-level fill condition with no rotation of the apparatus of Example 1B, the solids flow rate drawn out of the fluidized bed steadily decreases over time (see sequential run nos. 7-9 and sequential run nos. 12-14). Also, at lower pump rotation speeds, ratholes take longer to reach a particular size and solids flow rate, all other things being equal, is lower than the corresponding values at higher pump rotation speeds. Also, any speed of rotation of the apparatus of Example 1B that is >0 rpm is expected to be effective for preventing or breaking ratholes. Further, the solids flow rate that is decreased by ratholes when drawing solids without rotation of the apparatus of Example 1B can be restored to solids flow rate achievable in absence of ratholes by resuming rotation of the apparatus of Example 1B (compare run nos. 9 and 10; and compare run nos. 14 and 15).

| Run No. | Pump rotation speed (rpm) | Apparatus of Example 1B rotation speed (rpm) | Starting solids Level (fill height in inches) | catch weight time (s) | Calculated Solids (microspheres) flow rate (g/min) | Rathole character |
|---|---|---|---|---|---|---|
| 1 | 260 | 40 | 7 | 20 | 84 | Prevented/Not formed |
| 2* | 260 | 0 | 7 | 20 | 97 | Not formed |
| 3* | 260 | 0 | 7 | 20 | 97 | Not formed |
| 4* | 260 | 0 | 7 | 20 | 94 | Not formed |
| 5 | 260 | 40 | 7 | 20 | 93 | Prevented/Not formed |
| 6 | 260 | 40 | 3 | 20 | 84 | Prevented Not formed |
| 7* | 260 | 0 | 3 | 20 | 31 | Formed/present |
| 8* | 260 | 0 | 3 | 20 | 18 | Enlarged |
| 9* | 260 | 0 | 3 | 20 | 13 | Further enlarged |
| 10 | 260 | 40 | 3 | 13 | 85 | Broken |
| 11 | 200 | 40 | 3 | 25 | 66 | Prevented |
| 12* | 200 | 0 | 3 | 20 | 58 | Formed/present |
| 13* | 200 | 0 | 3 | 20 | 37 | Enlarged |
| 14* | 200 | 0 | 3 | 15 | 20 | Further enlarged |
| 15 | 200 | 40 | 3 | 30 | 62 | Broken |
| 16 | 200 | 20 | 3 | 45 | 66 | Prevented |

*denotes comparative (non-invention) example.

As shown by the Examples, the present invention has the uses and advantages described previously herein, especially those listed in the Brief Summary of the Present Invention.

What is claimed is:

1. A mechanical gas pocket breaker comprising a cylindrical hub having a rotational axis and first and second braced asterisk-shaped assemblies, each assembly comprising at least 3 arm members and at least 3 brace members in operative connection therebetween, wherein the arm members of each assembly are in radial operative connection to and circumferentially spaced around the hub in such a way such that the first assembly is generally parallel to and spaced-apart from the second assembly.

2. The breaker of claim 1, wherein a majority of the arm members of the first assembly are rotationally offset from a majority of corresponding ones of the arm members of the second assembly when the first and second assemblies are viewed down the axis of the hub of the mechanical gas pocket breaker.

3. The breaker of claim 2, wherein all of the arm members of the first assembly are rotationally offset from corresponding ones of all of the arm members of the second assembly when the first and second assemblies are viewed down the axis of the hub of the mechanical gas pocket breaker.

4. The breaker of claim 1 comprising at most three braced asterisk-shaped assemblies, each assembly independently having from 6 to 12 arm members and from 12 to 36 brace members.

5. The breaker of claim 1 further comprising from 6 to 12 linking members in operative connection between arm members of different assemblies.

6. A method of delaying formation of or breaking a gas pocket, the method comprising rotating the mechanical gas pocket breaker of any one of the preceding claims in operative contact with the gas pocket until formation of the gas pocket is delayed or the gas pocket is broken.

7. The method as in claim 6, wherein the gas pocket is broken.

8. The method as in claim 6, wherein the gas pocket comprises a gas/liquid bubble or a gas pocket in particulate solids.

9. A manufactured article comprising the mechanical gas pocket breaker of claim 1.

* * * * *